United States Patent
Nevoret (10) Patent No.: US 11,826,994 B2
(45) Date of Patent: Nov. 28, 2023

(54) HEAT SEAL ADHESIVE COATING COMPOSITIONS AND COATING BLANKETS INCLUDING THE SAME

(71) Applicant: Day International, Inc., Arden, NC (US)

(72) Inventor: Damien Nevoret, Hendersonville, NC (US)

(73) Assignee: Day International, Inc., Arden, NC (US)

( * ) Notice: Subject to any disclaimer, the term of this patent is extended or adjusted under 35 U.S.C. 154(b) by 217 days.

(21) Appl. No.: 17/225,582

(22) Filed: Apr. 8, 2021

(65) Prior Publication Data

US 2022/0324215 A1    Oct. 13, 2022

(51) Int. Cl.
| | |
|---|---|
| *B32B 27/36* | (2006.01) |
| *B32B 27/30* | (2006.01) |
| *B32B 27/40* | (2006.01) |
| *B32B 37/12* | (2006.01) |
| *C09D 175/04* | (2006.01) |
| *C09D 7/40* | (2018.01) |

(52) U.S. Cl.
CPC ............ *B32B 27/36* (2013.01); *B32B 27/304* (2013.01); *B32B 27/40* (2013.01); *B32B 37/12* (2013.01); *C09D 7/40* (2018.01); *C09D 7/68* (2018.01); *C09D 7/69* (2018.01); *C09D 175/04* (2013.01); *B32B 2037/1223* (2013.01); *B32B 2327/06* (2013.01); *B32B 2367/00* (2013.01); *B32B 2375/00* (2013.01)

(58) Field of Classification Search
CPC ....... B32B 27/36; B32B 27/40; B32B 27/304; B32B 37/12; B32B 2037/1223; B32B 2375/00; B32B 2367/00; B32B 2327/06
USPC ......................................................... 524/500
See application file for complete search history.

(56) References Cited

U.S. PATENT DOCUMENTS

| | | | |
|---|---|---|---|
| 4,978,707 A | 12/1990 | Tanaka et al. | |
| 7,087,279 B2 | 8/2006 | Callahan et al. | |
| 10,563,086 B2 | 2/2020 | Deak et al. | |
| 2005/0100754 A1 | 5/2005 | Moncla et al. | |
| 2008/0299346 A1 | 12/2008 | Onderisin et al. | |
| 2012/0220699 A1* | 8/2012 | Choudhery | C09D 5/02 524/517 |
| 2016/0027346 A1 | 1/2016 | Schneider et al. | |
| 2018/0215957 A1 | 8/2018 | Endle et al. | |
| 2019/0010362 A1* | 1/2019 | Lin | C09J 5/06 |
| 2020/0407608 A1* | 12/2020 | Brown | C08G 18/42 |

FOREIGN PATENT DOCUMENTS

| | | | |
|---|---|---|---|
| JP | 2001234475 A | * | 8/2001 |
| WO | 2011058119 A1 | | 5/2011 |
| WO | 2017024211 A1 | | 2/2017 |
| WO | 2019193501 A1 | | 10/2019 |

OTHER PUBLICATIONS

Translation of JP 2001-234475 (patents application 2000-049425), Aug. 31, 2001. (Year: 2001).*
Cohen, Modern Coating and Drying Technology, Wiley, May 1992.
Search Report and Written Opinion pertaining to International Application No. PCT/US2022/019456 dated Jun. 22, 2022, 15 pages.

* cited by examiner

*Primary Examiner* — Hui H Chin
(74) *Attorney, Agent, or Firm* — DINSMORE & SHOHL LLP (57) ABSTRACT

Embodiments of the present disclosure are directed to a coating composition comprising a first thermoplastic resin suspended in a liquid medium, and a second thermoplastic resin in the form of solid particles, wherein the second thermoplastic resin is incorporated but insoluble in the liquid medium.

21 Claims, 6 Drawing Sheets

HEAT SEAL ADHESIVE COATING COMPOSITIONS AND COATING BLANKETS INCLUDING THE SAME

BACKGROUND

Field

The present specification generally relates to adhesive coating compositions and, more specifically, to adhesive coating compositions for use in thermal lamination.

Technical Background

Coatings providing heat seal properties to polymeric films or other substrates have been used in a variety of industries, including but not limited to packaging, automotive, electronic, medical, and apparel industries. In use, the application of heat and pressure to the coated substrate seals the substrate to itself or to another substrate in a thermal lamination process.

In various thermal lamination processes, the coated substrate is provided in the form of a roll, with the coated substrate being successively wrapped over itself such that the coating of the first layer is in contact with the substrate of the next layer on the roll. Although the coating may have a softening point that is higher than room temperature, the coating can "block" when the coated substrate is stored as a roll. Blocking refers to the coating adhering to a surface with which it is in contact, such as the substrate of the next layer on the roll.

Blocking can worsen over time as a result of, for example, cold flow or creep of the coating. To reduce or eliminate blocking, a release liner or anti-blocking agent may be used. Release liners may be laminated over the coating such that the coating does not contact the substrate of the next layer of the roll. However, the use of release liners add to the cost and complexity of the manufacturing process, as the release liner must be removed prior to the thermal lamination of the coated substrate.

Anti-blocking agents added to the coating can be in the form of particles which protrude from the surface of the coating and mechanically prevent the coating from contacting an adjacent substrate. However, the amount of anti-blocking agents must be carefully controlled to prevent the coating from becoming too thick such that the particles do not protrude from the surface of the coating, while also having enough adhesive to flow and bond with the substrate during lamination. Moreover, some anti-blocking agents or anti-blocking chemicals can interfere with the adhesion properties of the coating.

Accordingly, there is a need for alternative heat seal coatings that provide adhesion during thermal lamination and anti-blocking without requiring the use of costly and inefficient release liners.

SUMMARY

Embodiments of the present disclosure meet this need by providing a coating composition comprising a first thermoplastic resin suspended in a liquid medium and a second thermoplastic resin in the form of solid particles that are incorporated but insoluble in the liquid medium. The first thermoplastic resin forms a continuous film or heat seal that provides adhesion, while the solid particles of the second thermoplastic resin protrude from the continuous film, thereby providing anti-blocking properties to the coating while also providing additional adhesion properties to the coating when heated as part of the heat seal.

According to one embodiment, a coating composition is provided. The coating composition comprises a first thermoplastic resin suspended in a liquid medium, and a second thermoplastic resin in the form of solid particles, wherein the second thermoplastic resin is incorporated but insoluble in the liquid medium.

According to another embodiment, a coated substrate is provided. The coated substrate comprises a polymeric substrate having a first major surface; and a cured coating formed from the above coating composition disposed on the first major surface of the polymeric substrate.

According to yet another embodiment, a coating blanket is provided. The coating blanket comprises a polymeric substrate, an elastomeric layer, and a heat seal layer positioned between the polymeric substrate and the elastomeric layer, the heat seal layer comprising a multi-phase coating formed from the above described coating composition, wherein a second phase comprising the second thermoplastic resin has a greater thickness than a first phase comprising the first thermoplastic resin.

Additional features and advantages will be set forth in the detailed description, which follows, and in part will be readily apparent to those skilled in the art from that description or recognized by practicing the embodiments described herein, including the detailed description, which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to various embodiments of coatings that include a first thermoplastic resin suspended in a liquid medium and a second thermoplastic resin in the form of solid particles that are incorporated but insoluble in the liquid medium. Embodiments of the coatings described herein form a continuous film on a substrate to which they are applied, and the particles of the second thermoplastic resin protrude from the surface of the film. The first thermoplastic resin forms the continuous film or heat seal that provides adhesion. The second thermoplastic resin provides anti-blocking properties to the coating, while also providing additional adhesion properties to the coating when heated as part of the heat seal, such as during a lamination process. The second thermoplastic resin also provides channels for air release during a lamination process. Various embodiments of coating compositions, coated substrates, and methods of sealing substrates using the same will be described.

Unless otherwise indicated, the disclosure of any ranges in the specification and claims are to be understood as including the range itself and also anything subsumed therein, as well as the endpoints.

As used herein, a "dispersion" or "dispersed" refers to a particulate discontinuous phase in a continuous liquid medium.

In various embodiments, the coating composition comprises at least a first thermoplastic resin and a second thermoplastic resin that differs from the first thermoplastic resin. The first thermoplastic resin is suspended in a liquid medium. For example, in embodiments, the first thermoplastic resin is provided in liquid form, or is a solid dissolved or dispersed in a liquid medium. In embodiments in which the first thermoplastic resin is provided in liquid form, the second thermoplastic resin is incorporated in, but insoluble in the first thermoplastic resin. In embodiments in which the first thermoplastic resin is dissolved or dispersed in a liquid medium, the second thermoplastic resin is incorporated in, but insoluble in the liquid medium.

In various embodiments, the first thermoplastic resin is a film-forming resin. As used herein, the phrase "film-forming resin" refers to a resin that forms a continuous film in the form of a pliable, cohesive, and continuous coating layer upon drying and curing. When present in solid form, the particles of the first thermoplastic resin may have an average particle size of less than about 2.0 microns (µm). For example, the particles of the first thermoplastic resin may have an average particle size of less than about 2.0 µm, less than about 1.5 µm, less than about 1.0 µm, or less than about 0.5 µm. Without being bound by theory, it is believed that an average particle size of less than about 2.0 µm or even less than about 0.5 µm can facilitate the formation of a continuous film upon drying.

The first thermoplastic resin may be selected from any known thermoplastic adhesive and may be selected based, at least in part, on its softening point and solubility in the liquid medium to be used. Accordingly, in various embodiments, when coated on a substrate, the coating composition can form a heat seal coating. In embodiments, the first thermoplastic resin has a softening point of greater than or equal to between 50 and 200° C., or from 70 to 180° C., wherein the softening point is calculated by the ring and ball method of ASTM E28-99.

Thermoplastic resins suitable for use include vinyl chlorides, vinylidene chlorides, polyurethanes, acrylics, polyamides, polyacrylates, polyvinyl acetate (PVA), and polyesters.

In one or more embodiments, the polyesters may be linear, long-chain polyester resins (weight average molecular weight (Mw) ranging from 10,000 to about 150,000), that have minimal to no branching and minimal to no unsaturation for crosslinking (though aromatic components may be present). For example, further embodiments may include polyesters or polyurethanes made from aliphatic or aromatic polyester diols reacted with diacids (molecules containing 2 carboxylic acid groups) or anhydrides to make linear thermoplastic polyester resins, or with diisocyanates to make thermoplastic polyurethanes (TPUs). These polyester diols may include ethylene glycol, diethylene glycol, butane diol, propylene glycol, hexane diol, neopentyl glycol, 2-methyl-1,3-propane diol, trimethylolpropane (triol), cyclohexanedimethanol and caprolactone-based polyols. Such diols can be reacted with the following diacids to make thermoplastic polyesters: adipic acid, dodecanoic acid, azelaic acid, isophthalic acid terephthalic acid, sebacic acid, and cyclohexanedicarboxylic acid; and/or with the following anhydrides: phthalic anhydride or maleic anhydride. Molecular weights of the diols vary from 300 to 4000. In addition to polyester-based diols/polyols, there exists a wide variety of diols with other backbones that can be reacted with diacids, anhydrides, or isocyanates to create thermoplastic adhesives, including diols containing butadiene, polycarbonate, polyether glycols, styrene, acrylates, acrylonitrile, and other monomers or blocks reacted into the diol backbone.

Commercially available thermoplastic binders suitable for use as the first thermoplastic binder include, but are not limited to, products sold under the tradenames ADCOTE™ available from The Dow Chemical Company (Midland, MI), VYCAR™ and Sancure™ available from The Lubrizol Corporation (Wickliffe, OH), Neorez™ or Neocryl™ available from DSM (Netherlands), VITEL™ or Thermogrip™ available from Bostik, Inc. (Wauwatosa, WI), DYNAPOL™ and DYNACOLL™ available from Evonik Industries AG (Germany), and ELVACITE™ available from Lucite International Inc. (Cordova, TN). Moreover, additional commercial examples may include: Toyobo Vylon™ (Osaka, Japan); Mitsubishi Chemical Nichigo-Polyester™ (Tokyo, Japan); LG MMA BA Series™ (Seoul, Korea), and Ashland Pureseal™ (Covington, KY). The first thermoplastic resin can be provided in liquid form, or can be dissolved, dispersed, or otherwise suspended in a liquid medium, depending on the particular embodiment.

Various weight percentages for the first and second thermoplastic resins are contemplated herein. In the present embodiments, the weight percentages are provided as a dry basis composition in terms of the first and second thermoplastic resins, or as a solids/active content. Said another way, the dry basis is the total solids/actives content in the blended mixture after water and/or solvent removal.

For the dry basis composition, the weight percent of the first thermoplastic composition is 40 to 98 wt. %, or from 50 to 95 wt. % or from 65 to 90 wt. %. Correspondingly, the weight percent of second thermoplastic resin at a dry basis is from 2 to 60 wt. %, or from 5 to 50 wt. %, or from 10 to 35 wt. %. When measuring total actives content, the first thermoplastic resin plus the second thermoplastic resin is between 5 and 85%, or between 10 and 60%, or between 25 and 55% of the composition, while water or solvent conversely makes up the balance. For the coating compositions, the viscosity range is 250 cP to 50,000 cP, or 500 to 30,000 cP, or 1000-6000 cP.

In various embodiments, the liquid medium can be, by way of example and not limitation, water, solvent, or mixtures thereof. Solvents suitable for use can include, for example, toluene, methyl ethyl ketone (MEK), ethyl acetate, acetone, dioxolane, isophorone, cyclohexanone, isopropanol, ethanol, pentanedione, butyl acetate, n-propyl acetate, 1,1,1-trichloroethane, methylene chloride, trichloroethylene, xylene, n-methyl-2-pyrrolidone (NMP), tetrahydrofuran (THF), aromatic fluid (e.g., Solvesso™ from ExxonMobil), naphtha, heptane, and mixtures thereof.

In various embodiments, the liquid medium is present in the coating composition in an amount of from about 20 wt. % to about 95 wt. % based on the total weight of the coating composition as formulated for application to the substrate. For example, the coating composition may include from about 20 wt % to about 95 wt. % liquid medium, from about 20 wt. % to about 90 wt. % liquid medium, from about 20 wt. % to about 85 wt. % liquid medium, from about 20 wt. % to about 80 wt. % liquid medium, from about 20 wt. % to about 75 wt. % liquid medium, from about 20 wt. % to about 70 wt. % liquid medium, from about 20 wt. % to about 65 wt. % liquid medium, from about 20 wt. % to about 60 wt. % liquid medium, from about 20 wt. % to about 55 wt. % liquid medium, from about 20 wt. % to about 50 wt. % liquid medium, from about 30 wt. % to about 95 wt. % liquid medium, from about 30 wt. % to about 90 wt. % liquid medium, from about 30 wt. % to about 85 wt. % liquid medium, from about 30 wt. % to about 80 wt. % liquid medium, from about 30 wt. % to about 75 wt. % liquid medium, from about 30 wt. % to about 70 wt. % liquid medium, from about 30 wt. % to about 65 wt. % liquid medium, from about 30 wt. % to about 60 wt. % liquid medium, from about 30 wt. % to about 55 wt. % liquid medium, from about 30 wt. % to about 50 wt. % liquid medium, from about 40 wt. % to about 95 wt. % liquid medium, from about 40 wt. % to about 90 wt. % liquid medium, from about 40 wt. % to about 85 wt. % liquid medium, from about 40 wt. % to about 80 wt. % liquid medium, from about 40 wt. % to about 75 wt. % liquid medium, from about 40 wt. % to about 70 wt. % liquid medium, from about 40 wt. % to about 65 wt. % liquid medium, from about 40 wt. % to about 60 wt. % liquid medium, from about 40 wt. % to about 55 wt. % liquid medium, from about 40 wt. % to about 50 wt. % liquid medium, from about 50 wt. % to about 95 wt. % liquid medium, from about 50 wt. % to about 90 wt. % liquid medium, from about 50 wt. % to about 85 wt. % liquid medium, from about 50 wt. % to about 80 wt. % liquid medium, from about 50 wt. % to about 75 wt. % liquid medium, from about 50 wt. % to about 70 wt. % liquid medium, from about 50 wt. % to about 65 wt. % liquid medium, or from about 50 wt. % to about 60 wt. % liquid medium, including any and all ranges and sub-ranges in between.

In various embodiments, the second thermoplastic resin is in the form of solid particles that are incorporated (e.g., dispersed, mixed, or blended) but insoluble in the liquid medium. The second thermoplastic resin may be, for example, a hot melt powder. In various embodiments, the second thermoplastic resin has an average particle size that is greater than or equal to about 2.0 µm. For example, the second thermoplastic resin may have an average particle size of greater than or equal to about 2.0 µm, greater than or equal to about 5.0 µm, greater than or equal to about 10 µm, greater than or equal to about 25 µm, greater than or equal to about 50 µm, greater than or equal to about 75 µm, greater than or equal to about 100 µm, greater than or equal to about 125 µm, greater than or equal to about 150 µm, greater than or equal to about 175 µm, greater than or equal to about 200 µm, greater than or equal to about 300 µm, greater than or equal to about 400 µm, greater than or equal to about 500 µm, or greater than or equal to about 600 µm. In some embodiments, the second thermoplastic resin has an average particle size of from about 2 µm to about 600 µm, from about 2 µm to about 200 µm, from about 2 µm to about 60 µm, from about 50 µm to about 600 µm, from about 50 µm to about 200 µm, from about 50 µm to about 180 µm, from about 100 µm to about 600 µm, or from about 100 µm to about 200 µm, including any and all ranges and sub-ranges in between. In some embodiments, the second thermoplastic resin has an average particle size that is at least 10% greater than the average particle size of the first thermoplastic resin. In embodiments, the second thermoplastic resin has an average particle size that is at least two times the average particle size of the first thermoplastic resin. In various embodiments, the particles of the second thermoplastic resin are sized such that at least a portion of the particles protrudes from the coating (i.e., film) formed by the first thermoplastic resin. In embodiments, the particles of the second thermoplastic resin have a spherical, ovoid, platy, acicular, or other three-dimensional form. Without being limited by theory, when particle morphology is substantially different from a sphere, one or two of its characteristic dimensions is substantially less than the others. In many conventional coating processes, the particles will be deposited in random orientations and then will slump before the coating has become viscous enough to prevent them from moving. Consequently, the smallest dimension of the particle becomes critical, because most particles will likely end up oriented with this dimension orthogonal to the substrate in the dried, cured coating. Thus, in the case of plates or rods, they will be oriented flat, with their longer dimensions parallel to the surface of the substrate film.

The second thermoplastic resin may be selected from any known thermoplastic adhesive and may be selected based, at least in part, on its softening point, particle size, and solubility in the liquid medium to be used (and more specifically, its lack of solubility in the liquid medium). Moreover, in some embodiments, the particles of the second thermoplastic resin do not substantially coalesce with the first thermoplastic resin after drying and curing of the coating composition. Accordingly, in various embodiments, the cured coating is a multi-phase coating in which the first thermoplastic resin is present in a first phase and the second thermoplastic resin is present in a second phase. More particularly, in embodiments, when the first thermoplastic resin is cured to form the film of the coating, the particles of the second thermoplastic resin remain unmelted during the curing and film-forming process and remain as a separate phase from the film, though are physically bonded to the film.

In embodiments, the softening point of the second thermoplastic resin could be higher, lower or equal to that of the first thermoplastic resin. In some embodiments, particles from the second thermoplastic resin have a higher softening point than the first thermoplastic resin, as this may provide more effective anti-blocking ability. However, this is not necessary in all embodiments, because a large part of the anti-blocking behavior comes from the reduction in contact area between successive wraps or layers, since only the tops of the particles make contact with the wrap above them.

The second resin should not substantially flow or melt when the first resin is dried and cured so that the particles retain their shape. Without being limited to theory, the amount of time required to dry and cure the first resin is typically too short or mild to cause the second resin particles to "melt", so the softening point range for the second resin can be the same as for the first resin, for example, between 50 and 200° C., more preferably between 70 and 180° C., as measured by the ring and ball test.

As with the first thermoplastic resin, the suitable thermoplastic resins of the second thermoplastic resin may include copolyamides, cyanoacrylates, polyacrylates, polyurethanes, polyvinyl acetate (PVA), and copolyesters. The other embodiments and commercial products listed for the first thermoplastic resin are also applicable to the second thermoplastic resin.

In some embodiments, the coating composition also includes one or more additives. Additives can include, by way of example and not limitation, cross-linkers, wetting agents, dispersants, thickeners, defoamers, tackifiers, and adhesion promoters. Wetting agents, or surfactants, can be included in the coating composition to lower the surface tension of the coating composition. Dispersants can include surfactants, plasticizers, or the like, and may be included to stabilize the coating composition against flocculation of the solid particles of the second thermoplastic resin. Thickeners may be added to the coating composition to increase the viscosity of the coating composition. For example, thickeners may be used to adjust the viscosity of the coating composition depending on the particular method by which the coating composition will be applied to the substrate. Defoamers may be added to the coating composition to prevent the formation or foam. Tackifiers may be used to modify the viscoelastic properties of the resins. Adhesion promoters can include polyurethanes, polyethylene imine, and the like. Without being bound by theory, adhesion promoters may aid in promoting adhesion of the film to the substrate.

In some embodiments, thickeners for water-based systems may include cellulosic thickeners, associative urethanes (HEUR/PUR), alkali-swellable polyacrylate emulsions, fumed silica, and clays. Thickeners for solvent-based systems include polyamides, hydrogenated castor oils, fumed silica, and clays. Wetting agents may include silicones/polysiloxanes, polyacrylates, fluorinated polyacrylates, acetylenic diols, fluorosurfactants, fatty alcohol alkoxylates, and sulfosuccinates.

Dispersants may include low molecular weight oligomers based on polyesters, polyamides, or polyglycols and fatty acids (FAME—fatty acid modified emulsifiers); polymeric dispersants based on polyacrylic acid, polyurethane, or polyacrylate; modified alkoxylates; and salts of polyacrylates, polyphosphates, and polycarboxylic acids.

Curing/crosslinking agents may include isocyanates, aziridines, melamines, polycarbodiimides, amines, amides, and anhydrides. Defoamers may include mineral oils, waxes, hydrophobic particles, silicones, fatty acid esters, and blends thereof. Adhesion promoters and coupling agents may include organosilanes, organotitanates, organozirconates, and zircoaluminates.

Tackifiers may include tackifiers derived from rosin such as rosin acids, rosin esters, and dimerized rosins, which may be hydrogenated or otherwise modified; as well as hydrocarbon resins, such as aliphatic C5 resins, aromatic C9 resins, or copolymerized C5 and C9 resins, which may be hydrogenated or otherwise modified.

When included in the coating composition, the additives may be present in an amount of up to about 35 wt. % based on a total weight of the coating composition. For example, the coating composition can include additives in an amount of from greater than 0 wt. % to about 30 wt. %, 0.5 wt. % to about 25 wt. %, from 1.0 wt. % to about 15 wt. %, from greater than 0 wt. % to about 10 wt. %, from greater than 0 wt. % to about 5 wt. %, from about 5 wt. % to about 20 wt. %, from about 5 wt. % to about 15 wt. %, from about 5 wt. % to about 10 wt. %, from about 10 wt. % to about 20 wt. %, or from about 10 wt. % to about 15 wt. %, including any and all ranges and sub-ranges in between. However, it should be understood that the inclusion of additives is optional and, in some embodiments, no additives are included in the coating composition.

As described hereinabove, in various embodiments, the coating composition is applied to a substrate, and dried to form a coating. The substrate has a first major surface and a second major surface opposing the first major surface and separated from the first major surface by a thickness t of the substrate. The thickness t of the substrate may vary depending on the particular embodiment. In embodiments, the substrate has a thickness t of less than or equal to about 500 μm, less than or equal to about 400 μm, less than or equal to about 300 μm, less than or equal to about 200 μm, less than or equal to about 100 μm, less than or equal to about 75 μm, less than or equal to about 50 μm, or less than or equal to about 25 μm. In embodiments the substrate has a thickness t of greater than or equal to about 10 μm, greater than or equal to about 20 μm, or greater than or equal to about 50 μm. For example, the substrate may have a thickness t of from about 20 μm to about 500 μm, from about 50 μm to about 400 μm, or from about 75 μm to about 380 μm, including any and all ranges and sub-ranges in between.

The substrate may be any suitable substrate used in heat seal applications and, in embodiments, may be a flexible substrate. The substrate may be, for example, a polymeric substrate such as polyethylene terephthalate (PET), polyimide, polylactic acid (PLA), polyhydroxyalkanoate (PHA), biaxially oriented polyethylene terephthalate (BOPET), polypropylene, biaxially oriented polypropylene (BOPP), polyethylene, biaxially oriented polyamide, nylon, polystyrene, polycarbonate, polyvinyl chloride, or the like. In embodiments, the substrate may be polyether ether ketone (PEEK), polysulfone, poly(p-phenylene oxide) (PPO), polyphenyl sulfide (PPS), metal foils (aluminum, copper, stainless steel), paper, paperboard, foam, rubber sheeting, fabrics, nonwovens, particularly coated fabrics.

The coating composition can be applied to the substrate according to any one of a variety of methods suitable for application of a coating to a substrate. The particular method of application may vary depending on, for example, the particular substrate employed, rheological properties of the coating composition, and the desired thickness of the resultant coating. In embodiments, the coating composition is applied to the substrate via knife coating, comma coating, three roll reverse coating, two roll kiss coating, slot-die coating, gravure coating, microgravure coating, air knife coating, dip coating, rod coating, and other roll-to-roll web coating methods as described for example in "*Modern Coating and Drying Technology*" Cohen, Gutoff, May 1992 Wiley.

Figure 1:
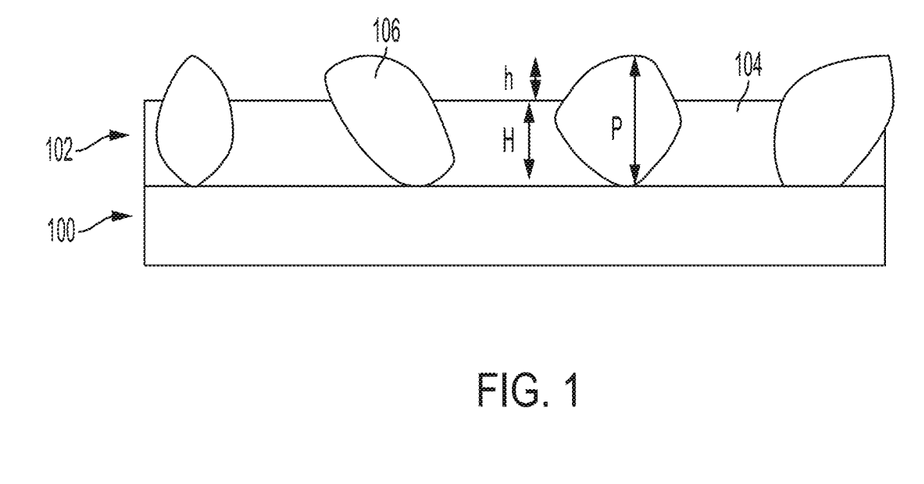
FIG. 1 illustrates a cross-section of a coated substrate according to one or more embodiments shown and described herein.

Following application of the coating composition to the substrate, the coating composition is cured to form a cured coating 102 on the surface of the substrate 100, as shown in FIG. 1. Upon curing, in various embodiments, the first thermoplastic resin forms a first phase, which may be, for example, a continuous film 104. In embodiments, any and all additives in the coating composition are present in the first phase of the cured coating. The cured coating also includes a second phase, which comprises the solid particles 106 of the second thermoplastic resin. In embodiments, the solid particles 106 of the second thermoplastic resin are the only component in the second phase. In embodiments, the second phase has a thickness that is greater than a thickness of the first phase of the cured coating. The solid particles of the second thermoplastic resin are dispersed throughout the thickness of the cured coating. As shown in FIG. 1, in various embodiments, a portion of the solid particles 106 of the second thermoplastic resin extend above, or protrude from, a top surface of the film 104 formed by the first thermoplastic resin.

The protrusion of the solid particles 106 of the second thermoplastic resin above the surface of the film 104 formed by the first thermoplastic resin enables the solid particles to mechanically prevent the film 104 from contacting another surface, such as a second major surface of the substrate 100 when the substrate is wound on a roll, for example. Accordingly, in various embodiments, the solid particles 106 impart an anti-blocking property to the cured coating. When the cured coating is heated during a lamination process, the solid particles 106 can soften and/or melt and improve adhesion because they are thermoplastic resins, in contrast to typical antiblocking particles (such as wax) that can adversely impact adhesion properties of a coating. Moreover, because the solid particles 106 are formed from a thermoplastic resin that soften or melt during lamination, the particles may not cause dents or protrusions in the materials being laminated, in contrast to coarse antiblocking particles such as silica. Accordingly, the coating compositions of various embodiments described herein include solid particles that can prevent blocking by acting as an antiblocking agent when coated onto the substrate without sacrificing lamination quality or adhesion, as the solid particles act as an adhesive during thermal lamination.

Said another way, the first thermoplastic resin and the second thermoplastic resin are thermoplastic adhesives, and as such they are both amorphous and can block. However, present embodiments minimize blocking by greatly reducing the contact area between the surface of the coating and the overlapping layer in a roll, because the overlapping layer contacts only the tips of the particles of the second thermoplastic resin, so that the force required to peel apart the layers when the roll is unwound is substantially lower than for a smooth coating.

In embodiments, the cured coating has a thickness of from 5 µm to about 75 µm, from about 10 µm to about 60 µm, from about 15 µm to about 50 µm, or from about 25 µm to about 50 µm. For example, the cured coating may have a thickness of from about 25 µm to about 50 µm, from about 25 µm to about 45 µm, from about 25 µm to about 40 µm, from about 25 µm to about 35 µm, from about 25 µm to about 30 µm, from about 30 µm to about 50 µm, from about 30 µm to about 45 µm, from about 30 µm to about 40 µm, from about 30 µm to about 35 µm, from about 35 µm to about 50 µm, from about 35 µm to about 45 µm, from about 35 µm to about 40 µm, from about 40 µm to about 50 µm, from about 40 µm to about 45 µm, or from about 45 µm to about 50 µm, including any and all ranges and sub-ranges therein. Other coating thicknesses are contemplated and possible, provided that the coating is not so thick that it "floods" the solid particles, preventing the solid particles from extending above the top surface of the film. However, the coating should be thick enough to provide a sufficient amount of adhesive to flow and bond with another surface during lamination. Although the cured coating is described in some embodiments herein as including two phases, as used herein, the "thickness of the cured coating" refers to the thickness of the phase including the first thermoplastic resin.

In embodiments, the thickness of the cured coating, or the thickness of the first phase is represented by H, as shown in FIG. 1. The normal distance of the outermost point of a solid particle from the interface between the coating and the substrate is represented by P, and the height of the portion of the solid particle that is not submerged by the first phase is represented by h, such that P=H+h. If the solid particles are fully submerged (e.g., h≤0, or P≤H), the antiblocking benefit from the solid particles is lost. However, if the solid particles are not sufficiently anchored by the first phase (e.g., h>>0, or P>>H), the solid particle can fall off of the coated substrate. Accordingly, in embodiments, a ratio of h:H is from 0.1:1 to 7:1, and a ratio of P:H is from 1.1:1 to 8:1. For example, where H is 25 µm, P is from about 27.5 µm to about 200 µm. It should be understood that the particular target range for P can vary, for example, depending on the shape of the solid particles, the aspect ratio of the solid particles, and the orientation of the solid particles.

In embodiments, the solid particles of the second thermoplastic resin may also function as a processing aid for lamination processes. For example, certain lamination processes are prone to air entrainment, which can result in undesired trapped air bubbles between the laminating adhesive and the second substrate to which the coated substrate is laminated. Trapped air bubbles can occur, for example, when the second substrate has surface imperfections in the form of cavities or raised areas that create voids in the lamination. Air entrainment can also result from the lamination of very smooth, non-porous surfaces that have little to no surface non-uniformities for air escape, a high coefficient of friction between the surfaces to be laminated which prevents the surfaces from sliding and flattening out before entering a lamination nip, high lamination speeds, misalignment (e.g., of substrates to each other, to the line, or of the line itself), insufficient nip pressure or temperature for the particular lamination surfaces, a low angle at entry to nip, or the like. Conventional solutions to reduce air entrainment or provide air release can include embossing the laminating adhesive to create air-release channels. However, embossing can require the use of a specially-textured release liner, which adds cost and complexity to the manufacturing line.

In various embodiments described herein, the solid particles of the second thermoplastic resin can create the air-release channels without the need for a special release liner. For example, the solid particles create raised areas between the coated substrate and the second substrate, thereby allowing for air escape during lamination. Moreover, since the solid particles are thermoplastic, the solid particles can deform during lamination and avoid the creation of raised areas that can actually trap air around them. Accordingly, the coated substrate may be advantageously used to make a coating blanket.

Coating blankets, which may also be called coating plates, are used in the printing and packaging industry to apply, for example, overprint varnishes (OPVs) to cover surfaces already printed with ink. The OPV may be applied in order to achieve a desired visual effect, such as a glossy or matte surface, and/or to protect the printed surface. OPVs can include, for examples, water-based, oil-based, or solvent-based coatings and energy curable systems. Suitable commercially available examples include those available under the tradename NOVACOAT™, Novaset™, UCURA™, and XCURA™ from Flint Group (Luxembourg). However, it should be understood that the coating blankets of various embodiments are not limited to a particular type of overprint varnish, and can be used for application of other types of coatings in addition to or as an alternative to overprint varnishes.

In use, the surface of the coating blanket is coated with the OPV and is then brought into contact with the substrate to which the OPV is transferred. In order to enable selective transfer of the OPV to the substrate (e.g., to coat only select areas of the printed surface), coating blankets have a top surface that can be cut and removed, leaving raised areas to coat the OPV in the target areas. Accordingly, in various embodiments, a coating blanket comprises an elastomeric layer bonded to a more rigid polymeric substrate film.

As set forth above, the polymeric substrate may be, for example, polyethylene terephthalate (PET), polylactic acid (PLA), polyhydroxyalkanoate (PHA), biaxially oriented polyethylene terephthalate (BOPET), polypropylene, biaxially oriented polypropylene (BOPP), polyethylene, biaxially oriented polyamide, nylon, polystyrene, polycarbonate, polyvinyl chloride, polyimide, metal foil and sheeting (e.g., aluminum, stainless steel) or the like.

In embodiments, the elastomeric layer is at least one of thermoplastic urethane, rubber, or PVC. In some embodiments, the elastomeric layer may be vulcanized. In such embodiments, extrusion-coating or calendaring the elastomeric layer to the polymeric substrate is performed prior to vulcanizing, and the elastomeric layer can be applied as a polymer compound in the form of a paste. Alternatively, there are cases where the elastomeric layer e.g., rubber sheeting may be vulcanized prior to lamination.

To form the coating blanket, the elastomeric layer can be extrusion-coated, calendared, or thermally laminated to the polymeric substrate. In various embodiments, the polymeric substrate is coated with the coating composition described herein, and the coating composition functions as a heat seal to adhere the elastomeric layer to the polymeric substrate. Additionally, in various embodiments, the solid particles of the second thermoplastic resin in the coating on the polymeric substrate can create pathways for air to escape the interface between the elastomeric layer and the polymeric substrate as they are joined, thereby leading to improved adhesion and consistent gauge around the coating blanket.

Although described as being used in a coating blanket, it is contemplated that the coated substrate may be used in any of a number of applications in which a heat seal adhesive is used, including, but not limited to, packaging applications, automotive or transportation applications, electronics applications, medical applications, apparel applications, or the like. More particularly, the coated substrate may be used in flexible packaging, blister packaging, multi-layer laminations, over-laminating cards, shrink sleeves, overwraps, bottle cap liners, interior trim attachment or liners for vehicles, sail cloth, flexible circuit electrical insulation, shoe soles, or the like.

In embodiments, the coating compositions described herein may have a reduced coefficient of friction of the coating as compared to an otherwise identical coating composition that does not include the solid particles of the second thermoplastic resin. Accordingly, the coating compositions of various embodiments may facilitate repositionability of the coated substrate onto a second substrate, which can be useful in applications in which discrete sheets or shapes of a flexible adhesive-coated substrate are laminated into a precise position with respect to a second substrate.

EXAMPLES

Various embodiments will be further clarified by the following examples.

Example 1

Various coating composition formulations were made by combining 100 parts by weight of SANCURE™ 20025F (a heat-sealable waterborne polyurethane dispersion with a solids content of 47% by weight available from The Lubrizol Corporation) with 6 parts by weight of TEXIPOL 63-510™ (a thickener based on a polyacrylate emulsion available from Scott Bader Co. Ltd.) and 89 parts by weight water. DIANAL TB-310™ (a thermoplastic acrylic resin in bead form, with particles ranging from approximately 50 μm to about 180 μm, available from Dianal Americas, Inc.) was added in the ratios described in Table 1 to the blend of SANCURE™ 20025F, TEXIPOL 63-510™, and water to form the coating compositions of Examples 1-3. Comparative Example A was a coating composition including the blend of SANCURE™ 20025F, TEXIPOL 63-510™, and water only.

TABLE 1

| Coating Composition | Parts TB-310 on 100 parts mixture |
| --- | --- |
| Comp. Ex. A | 0 |
| Ex. 1 | 1 (dry basis: 4% TB-310/96% blend) |
| Ex. 2 | 12.7 (dry basis: 33% TB-310/67% blend) |

Figure 2A:
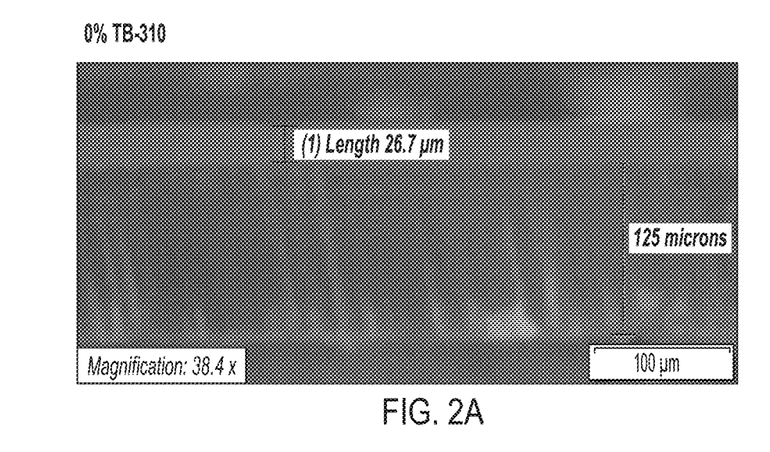
FIG. 2A is a cross-sectional image of a polyethylene terephthalate (PET) substrate having a coating formed from coating composition in Comparative Example A thereon.
Figure 3A:
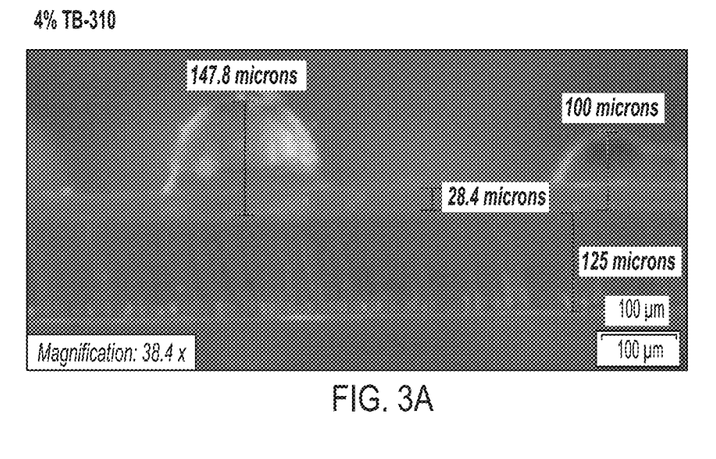
FIG. 3A is a cross-sectional image of a PET substrate having a coating formed from coating composition in Example 1 thereon.
Figure 3B:
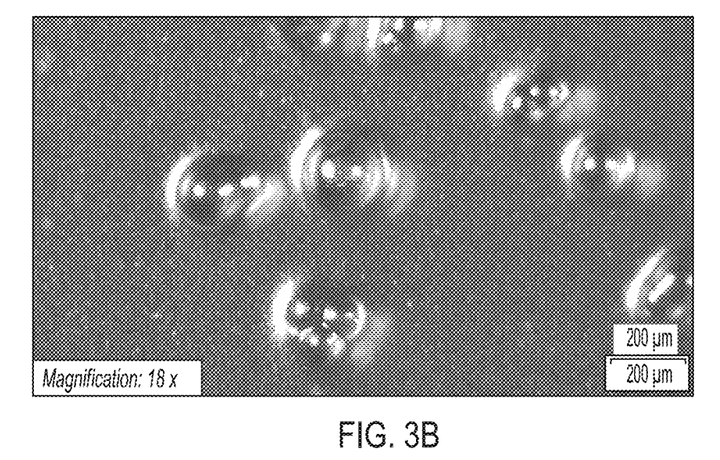
FIG. 3B is a top view of Example 1 as shown in FIG. 3A prior to the peel blocking test.
Figure 4A:
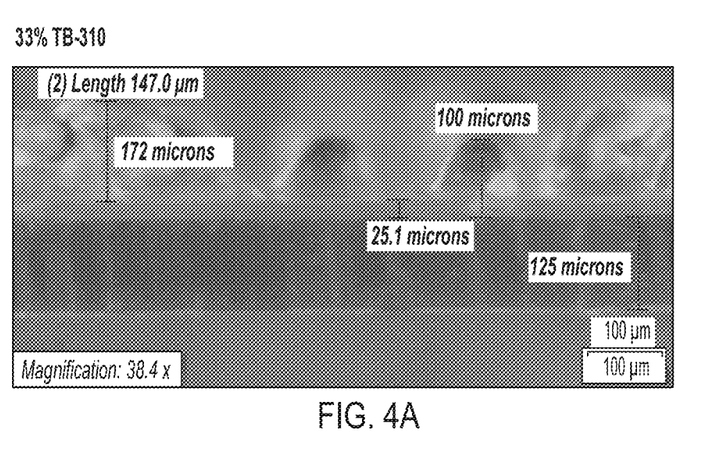
FIG. 4A is a cross-sectional image of a PET substrate having a coating formed from coating composition in Example 2 thereon.
Figure 4B:
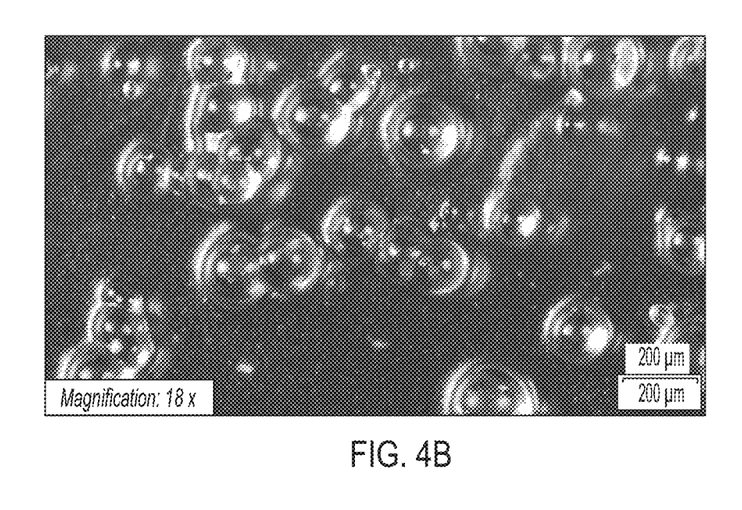
FIG. 4B is a top view of Example 2 as shown in FIG. 4A prior to the blocking test.

Drawdowns were prepared on 125 micron PET film, with a 10 mil (250 micron) gap on the knife coater. FIG. 2A is a cross-sectional image of the PET substrate taken with an optical microscope, the PET substrate having the coating of Comparative Example A thereon. As can be seen in FIG. 2A, the PET substrate had a thickness of 125 μm, the coating had a thickness (H) of 26.7 μm, and no solid particles protruding from the surface. In contrast, FIGS. 3A and 4A include cross-sectional images of the PET substrate having the coatings of Example 1 and thereon, respectively, and the solid particles have a height (P) of 100-172 μm.

After drying, 2 inch×8 inch strips were cut and stacked face up with an uncoated strip of 125 micron PET on top of the coated face of each strip. Strips were put into an oven for 10 hours at 54° C., with a 32 lb weight for a pressure of 2 psi to simulate blocking.

Peel adhesion tests were run on the strips at 2 in./min., with the following peel force results:

TABLE 2

| Coating Composition | Force required to separate (lbs.) |
| --- | --- |
| Comp. Ex. A | 0.51 |
| Ex. 1 | 0.21 |
| Ex. 2 | 0.03 |

Figure 2B:
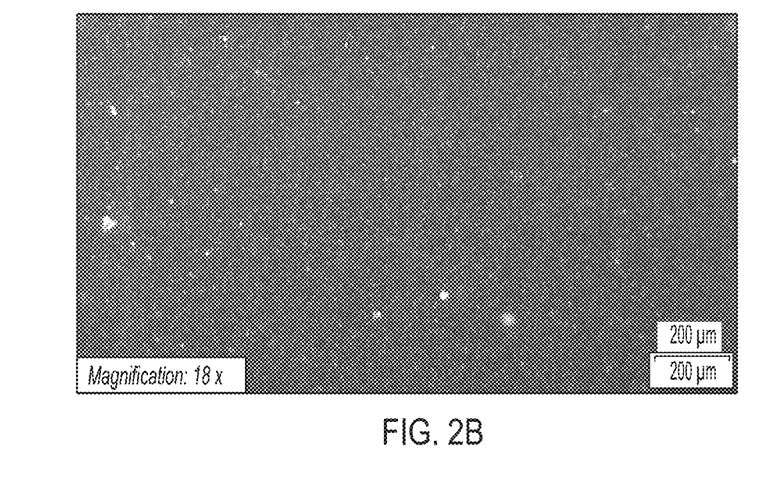
FIG. 2B is a top view of Comparative Example A of FIG. 2A prior to the peel blocking test.
Figure 2C:
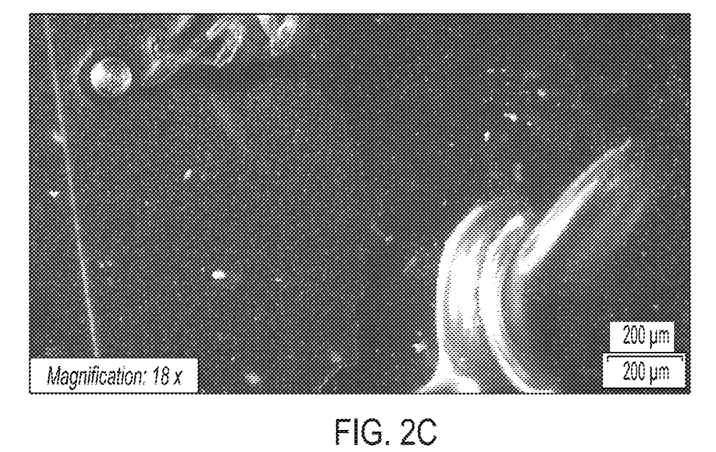
FIG. 2C is a top view of Comparative Example A of FIGS. 2A and 2B after the peel blocking test.
Figure 3C:
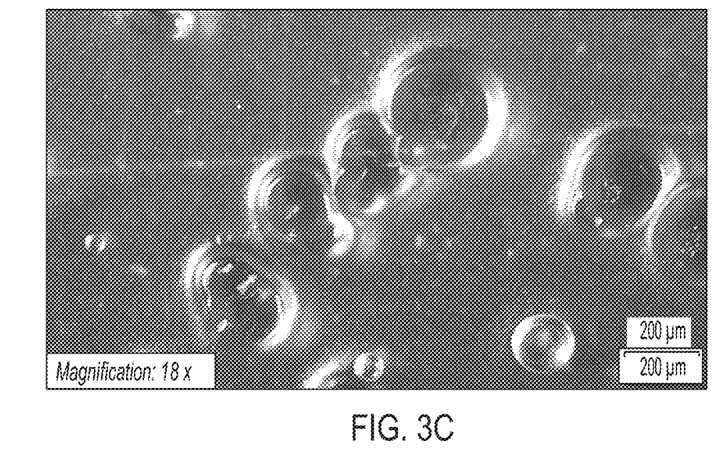
FIG. 3C is a top view of Example 1 of FIGS. 3A and 3B after the peel blocking test.
Figure 4C:
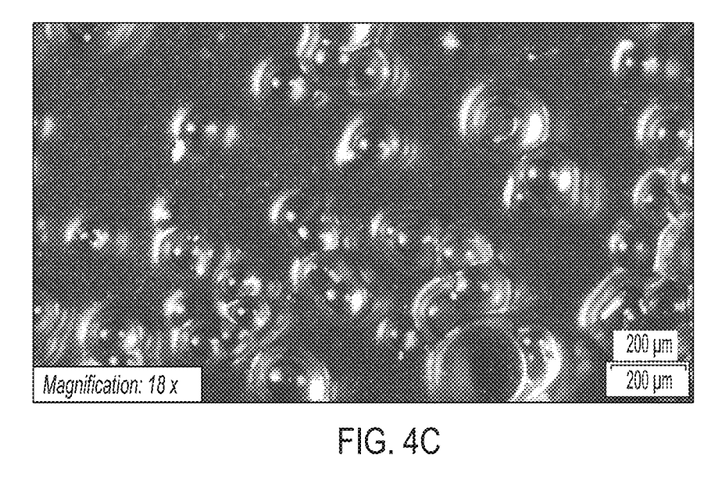
FIG. 4C is a top view of Example 2 of FIGS. 4A and 4B after the blocking test.

In Table 2, it is clear that Comp. Ex A required significantly more force to separate the layers than Examples 1 and 2. Referring to FIGS. 2B and 2C, when this force is applied to the structure of FIG. 2B, there is significant structural damage as shown in FIG. 2C. In contrast, the lesser force required to applied to separate the strips did not cause damage of the Examples 1 and 2 coatings as shown in post-blocking FIGS. 3C and 4C, respectively.

Example 2

Next, the coating compositions of Comparative Example A and Examples 1-2 were coated on sheets of PET film having a thickness of 350 μm such that the coat weight after drying was approximately 50 grams per square meter (g/m²), corresponding to an average coating thickness of approximately 45 μm. The solid particles had a median size of approximately 40 μm, with coarse particles up to about 80 μm.

A 1,500 micron PVC membrane was laminated to hand sheets of the 350 μm PET coated with the coating formulations using a drum laminator set to 166° C., with a dwell time of 90 seconds and nipping pressure estimated at 25 psi. Following lamination, the PVC membrane was stripped from the PET, and the PVC membrane was inspected for voids. Because the surface of the PVC membrane is not perfectly smooth, air-release channels are necessary to prevent cavities in the PVC membrane from forming voids in the lamination. The results of the inspections are provided in Table 3. The results demonstrate the air-release benefits from the presence of particles.

TABLE 3

| Coating Composition | Appearance of PVC Surface After Lamination | Appearance of PVC Surface in Contact with Heat Seal Coating |
|---|---|---|
| Comp. Ex. A | Blisters | Voids |
| Ex. 1 | No blisters | Slight voids |
| Ex. 2 | No blisters | No voids |

In Table 3, the term "voids" refers to the presence of approximately convex meniscus-shaped air pockets between the PVC membrane and the coating, ranging in diameter from approximately 2 to 5 mm and in height at the apex of approximately 300 μm to approximately 600 μm. The term "blisters" refers to visually noticeable raised surfaces on the top of the PVC surface caused by trapped air pockets, which expanded during lamination.

As reported in Table 3, the sheets coated with a coating formed from Comparative Example A had blisters and trapped air pockets, while the sheets coated with coatings formed from Examples 1 and 2, which include more solid particles, had no blisters and slight or no voids. Without being bound by theory, it is believed that the increased solid particle content in the coatings created more channels for air egress as the PVC was squeezed against and laminated to the coated PET, thereby minimizing preventing the formation of blisters and voids.

According to an aspect, either alone or in combination with any other aspect, a coating composition is provided. It comprises a first thermoplastic resin suspended in a liquid medium, and a second thermoplastic resin in the form of solid particles, wherein the second thermoplastic resin is incorporated but insoluble in the liquid medium.

According to a second aspect of the coating composition, either alone or in combination with the first or any other aspects, the liquid medium comprises solvent, water, or mixtures thereof.

According to a third aspect of the coating composition, either alone or in combination with the first or second aspects, or any other aspect, the solvent comprises one or more of MEK, toluene, ethyl acetate, n-propyl acetate, acetone, or dioxolane.

According to a fourth aspect of the coating composition, either alone or in combination with any of the first to third aspects as well as any other aspects, the solid particles have an average particle size of greater than about 2 μm.

According to a fifth aspect of the coating composition, either alone or in combination with any of the first to fourth aspects as well as any other aspects, the first thermoplastic resin has an average particle size of less than about 0.5 μm.

According to a sixth aspect of the coating composition, either alone or in combination with any of the first to fifth aspects as well as any other aspects, the solid particles of the second thermoplastic resin comprise at least one of polyesters, copolyesters, urethanes, polyamides, copolyamides, acrylics, copolyamides, and copolyesters.

According to a seventh aspect of the coating composition, either alone or in combination with any of the first to sixth aspects as well as any other aspects, the first thermoplastic resin comprises at least one of polyurethane, polyester, and acrylic.

According to an eighth aspect of the coating composition, either alone or in combination with any of the first to seventh aspects as well as any other aspects, wherein the coating composition comprises from 40 to 98 wt. % of the first thermoplastic resin from a dry basis, and from 2 to 60 wt. % of the second thermoplastic resin from a dry basis.

According to a ninth aspect of the coating composition, either alone or in combination with any of the first to eighth aspects as well as any other aspects, the coating composition comprises one or more additives selected from the group consisting of cross-linkers, wetting agents, dispersants, thickeners, defoamers, adhesion promoters, and combinations thereof.

According to a tenth aspect of the coating composition, either alone or in combination with any of the first to ninth aspects as well as any other aspects, the first thermoplastic resin, the second thermoplastic resin, or both have a softening point of greater than or equal to between 50 and 200° C.

According to an eleventh aspect, either alone or in combination with any other aspect, a coated substrate is provided. The coated substrate comprises a polymeric substrate having a first major surface, and a cured coating formed from the coating composition of any of the first to tenth aspects disposed on the first major surface of the polymeric substrate.

According to a twelfth aspect, either alone or in combination with the eleventh aspect or any other aspect, the polymeric substrate of the coating substrate comprises polyethylene terephthalate (PET).

According to a thirteenth aspect, either alone or in combination with the eleventh or twelfth aspects or any other aspect, wherein the cured coating has a thickness of from about 10 μm to about 50 μm.

According to a fourteenth aspect, either alone or in combination with any of the eleventh to thirteenth aspects as well as any other aspects, the cured coating is substantially continuous over the first major surface of the substrate.

According to a fifteenth aspect, either alone or in combination with any of the eleventh to fourteenth aspects as well as any other aspects, the cured coating comprises from about 2 to about 60 wt. % of the second thermoplastic resin based on a total weight of the cured coating.

According to a sixteenth aspect, either alone or in combination with any of the eleventh to fifteenth aspects as well as any other aspects, a second phase comprising the second thermoplastic resin has a greater thickness than a first phase comprising the first thermoplastic resin.

According to a seventeenth aspect, either alone or in combination with any of the eleventh to sixteenth aspects as well as any other aspects, particles of the second thermoplastic resin protrude another 5 to 200 microns above the surface of the first thermoplastic resin.

According to an eighteenth aspect, either alone or in combination with any of the eleventh to seventeenth aspects as well as any other aspects, the first thermoplastic resin, the second thermoplastic resin, or both have a softening point of greater than or equal to between 50 and 200° C.

According to a nineteenth aspect, either alone or in combination with any other aspect, a coating blanket is provided. The coating blanket comprises a polymeric substrate, an elastomeric layer, and a heat seal layer positioned between the polymeric substrate and the elastomeric layer. The heat seal layer comprises a multi-phase coating formed from the coating composition of any of the first to tenth aspects, wherein a second phase comprising the second thermoplastic resin has a greater thickness than a first phase comprising the first thermoplastic resin.

According to a twentieth aspect, either alone or in combination with the nineteenth aspect or any other aspect, the polymeric substrate comprises polyethylene terephthalate (PET).

According to a twenty-first aspect, either alone or in combination with the nineteenth or twentieth aspects or any other aspect, the elastomeric layer comprises at least one of thermoplastic urethane, polyvinyl chloride (PVC), or rubber.

According to a twenty-second aspect, either alone or in combination with any of the nineteenth to twenty-first aspects or any other aspect, the polymeric substrate has a thickness of from about 200 µm to about 400 µm, the elastomeric layer has a thickness of from about 700 µm to about 1700 µm, and the heat seal layer has a thickness of from about 25 µm to about 50 µm.

According to a twenty-third aspect, either alone or in combination with any of the nineteenth to twenty-second aspects or any other aspect, the first thermoplastic resin, the second thermoplastic resin, or both have a softening point of greater than or equal to between 50 and 200° C.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modifications and variations come within the scope of the appended claims and their equivalents.

What is claimed is:

1. A coating composition comprising:
   a liquid medium,
      wherein the coating composition comprises 20 to 70 wt. % of the liquid medium, and
      wherein the liquid medium comprises one or more of MEK, toluene, ethyl acetate, n-propyl acetate, acetone, or dioxolane;
   a first thermoplastic resin suspended in the liquid medium; and
   a second thermoplastic resin in the form of solid particles,
      wherein the second thermoplastic resin is incorporated but insoluble in the liquid medium, and
      wherein the solid particles have an average particle size of greater than about 25 µm.

2. The coating composition according to claim 1, wherein the solid particles have an average particle size of greater than about 50 µm.

3. The coating composition according to claim 1, wherein the first thermoplastic resin has an average particle size of less than about 0.5 µm.

4. The coating composition according to claim 1, wherein the solid particles of the second thermoplastic resin comprise at least one of polyesters, urethanes, polyamides, acrylics, copolyamides, and copolyesters.

5. The coating composition according to claim 1, wherein the first thermoplastic resin comprises at least one of polyurethane, polyester, and acrylic.

6. The coating composition according to claim 1, wherein the coating composition comprises from 40 to 98 wt. % of the first thermoplastic resin from a dry basis, and from 2 to 60 wt. % of the second thermoplastic resin from a dry basis.

7. The coating composition according to claim 1, further comprising one or more additives selected from the group consisting of cross-linkers, wetting agents, dispersants, thickeners, defoamers, adhesion promoters, and combinations thereof.

8. The coating composition according to claim 1, wherein the first thermoplastic resin, the second thermoplastic resin, or both have a softening point of between 50 and 200° C.

9. A coated substrate comprising:
   a polymeric substrate having a first major surface; and
   a cured coating formed from the coating composition of claim 1 disposed on the first major surface of the polymeric substrate.

10. The coated substrate according to claim 9, wherein the polymeric substrate comprises polyethylene terephthalate (PET).

11. The coated substrate according to claim 9, wherein the cured coating has a thickness of from about 10 µm to about 50 µm.

12. The coated substrate according to claim 9, wherein the cured coating is substantially continuous over the first major surface of the substrate.

13. The coated substrate according to claim 9, wherein the cured coating comprises from about 2 to about 60 wt. % of the second thermoplastic resin based on a total weight of the cured coating.

14. The coated substrate according to claim 9, wherein the cured coating is a multi-phase coating, wherein a second phase comprising the second thermoplastic resin has a greater thickness than a first phase comprising the first thermoplastic resin.

15. The coated substrate according to claim 9, wherein particles of the second thermoplastic resin protrude another 5 to 200 microns above the surface of the first thermoplastic resin.

16. The coated substrate according to claim 9, wherein the first thermoplastic resin, the second thermoplastic resin, or both have a softening point of between 50 and 200° C.

17. A coating blanket comprising:
   a polymeric substrate;
   an elastomeric layer; and
   a heat seal layer positioned between the polymeric substrate and the elastomeric layer, the heat seal layer comprising a multi-phase coating formed from the coating composition of claim 1, wherein a second phase comprising the second thermoplastic resin has a greater thickness than a first phase comprising the first thermoplastic resin.

18. The coating blanket according to claim 17, wherein the polymeric substrate comprises polyethylene terephthalate (PET).

19. The coating blanket according to claim 17, wherein the elastomeric layer comprises at least one of thermoplastic urethane, polyvinyl chloride (PVC), or rubber.

20. The coating blanket according to claim 17, wherein the polymeric substrate has a thickness of from about 200 µm to about 400 µm, the elastomeric layer has a thickness of from about 700 μm to about 1700 μm, and the heat seal layer has a thickness of from about 25 μm to about 50 μm.

21. The coating blanket according to claim 17, wherein the first thermoplastic resin, the second thermoplastic resin, or both have a softening point of between 50 and 200° C.

* * * * *